(12) United States Patent
Weekes (10) Patent No.: US 11,724,816 B2
(45) Date of Patent: Aug. 15, 2023

(54) HYBRID EVTOL POWER SYSTEM

(71) Applicant: ELROY AIR, INC., South San Francisco, CA (US)

(72) Inventor: Terik Weekes, San Francisco, CA (US)

(73) Assignee: ELROY AIR, INC., South San Francisco, CA (US)

( * ) Notice: Subject to any disclaimer, the term of this patent is extended or adjusted under 35 U.S.C. 154(b) by 0 days.

(21) Appl. No.: 17/815,828

(22) Filed: Jul. 28, 2022

(65) Prior Publication Data

US 2023/0034316 A1    Feb. 2, 2023

Related U.S. Application Data

(60) Provisional application No. 63/227,168, filed on Jul. 29, 2021.

(51) Int. Cl.
*B64D 27/24* (2006.01)
*B64C 29/00* (2006.01)
*B64D 27/02* (2006.01)

(52) U.S. Cl.
CPC ............. *B64D 27/24* (2013.01); *B64C 29/00* (2013.01); *B64D 2027/026* (2013.01); *B64D 2221/00* (2013.01)

(58) Field of Classification Search
None
See application file for complete search history.

(56) References Cited

U.S. PATENT DOCUMENTS

| | | | |
|---|---|---|---|
| 2018/0077918 A1* | 3/2018 | Yu | B64C 39/024 |
| 2022/0106038 A1* | 4/2022 | K T | B64C 39/024 |

* cited by examiner

*Primary Examiner* — Jared Fureman
*Assistant Examiner* — Aqeel H Bukhari
(74) *Attorney, Agent, or Firm* — Martensen IP; Michael C. Martensen (57) ABSTRACT

A reliable and redundant hybrid VTOL UAV power architecture includes two or more channels of high voltage AC power generated from at least one generator, the generator coupled to one or more liquid fueled turbine engines. Two or more high voltage domain modules, one for each channel, receive the high voltage AC power and, using a rectifier change it to high voltage DC power. A power distribution unit accepts the newly converted channel of high voltage DC power and thereafter bidirectionally provides it to a domain battery and to a primary set of motors. Two or more high voltage busses, each coupled separately to one of the two or more high voltage domain modules, each redundantly transport converted channel of high voltage DC power to, in one embodiment, primary sets of motors forming a primary high power domain bus for these select motors.

13 Claims, 6 Drawing Sheets

HYBRID EVTOL POWER SYSTEM

RELATED APPLICATION

The present application relates to and claims the benefit of priority to United States Provisional Patent Application Ser. No. 63/227,168 filed 29 Jul. 2021 which is hereby incorporated by reference in its entirety for all purposes as if fully set forth herein.

BACKGROUND OF THE INVENTION

Field of the Invention

Embodiments of the present invention relate, in general, to power production, and more particularly to power production for electric vertical takeoff and landing (eVTOL) vehicles.

Relevant Background

Vertical takeoff Unmanned Aerial Vehicles (UAV) come in many forms. With the expansion of digital communication, battery efficiency, weight savings, and refinements to computer processing, UAVs have exploded into a variety of markets. UAVs can be as simple as toys largely, limited to the backyard adventures, to sophisticated camera platforms for civilian and military applications.

UAVs can be of a fixed wing (a conventional aircraft) and/or vertical takeoff variant. Each requires power to generate lift. In most vertical takeoff and landing (VTOL) versions a plurality of vertical lift motors creates an aggregate vertical thrust component greater than the weight of the vehicle and any payload the vehicle may hold. For those UAVs aligned with a fixed wing design, power is directed to horizontally directed thrust enable a wing to generate the essential lift for flight.

Power is an essential component of any UAV. In almost all instances vertical thrust for VTOL is created by a plurality of electric motors. Similarly, power for most conventional flying UAV's is gained through a liquid fuel burning engine be it a turboprop or jet engine. Hybrid UAVs combine the capabilities of a conventional flying UAV with VTOL capability. In doing so the hybrid UAV must power both a vertical lift component and a horizontal thrust component.

As one can or reasonable skill in the relevant at can appreciate, weight is a prime constraint in UAV design. Each pound of added structure adds to a larger requirement for thrust and thereby, power. Another design consideration in all aircraft, and certainly in UAV design, is reliability/redundancy. Unlike other forms of transportation such as a truck, car, train or boat, system failures are unforgiving. Where a boat can seek the nearest port or a truck the closest service station, a VTOL UAV experiencing a power failure during a mission is not likely to survive.

To address these needs the current state of the art provides back up batteries or battery packs. As a primary battery pack, (source of power) fails, a redundant second battery back is made available. While adding additional weight, the UAV gains redundancy, and a higher degree of survivability. While additional or backup batteries is a reasonable approach for recreational UAVs or UAVs with limited scope of utilization, they are not feasible for long range hybrid drones. The added weight for redundancy directly impacts the lift capacity and range of operations.

What is needed is a highly reliable, redundant power system for hybrid VTOL UAVs. Such a system should enable the UAV to lose one or more power systems yet remain operational. Moreover, the solution should not impact the operational capacity of the UAV whether that be in the vertical lift capacity or range of operations. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A reliable and redundant hybrid VTOL UAV power architecture includes two or more channels of high voltage AC power generated from at least one generator, the generator coupled to one or more liquid fueled turbine engines. Two or more high voltage domain modules, one for each channel, receive the high voltage AC power and, using a rectifier change it to high voltage DC power. A power distribution unit accepts the newly converted channel of high voltage DC power and thereafter bidirectionally provides it to a domain battery. Two or more high voltage DC busses, each coupled separately to one of the two or more high voltage domain modules, transport each converted channel of high voltage DC power to, in one embodiment, a primary set of motors forming a primary high power domain bus for these select motors. Other high voltage busses coupled to other of the high voltage domain modules are considered secondary high voltage domain busses for the above-mentioned motors.

Responsive to failure of a component resulting in stoppage of power to the primary high voltage domain bus, power from one of the secondary high voltage domain busses is redirected to the otherwise unpowered motors. The power system architecture of the present invention provides redundant reliable power such that there not a single point of failure in the power system which would result in inability of the aircraft to fly and/or complete its operational mission.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements, or features may be exaggerated for clarity.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Figure 1:
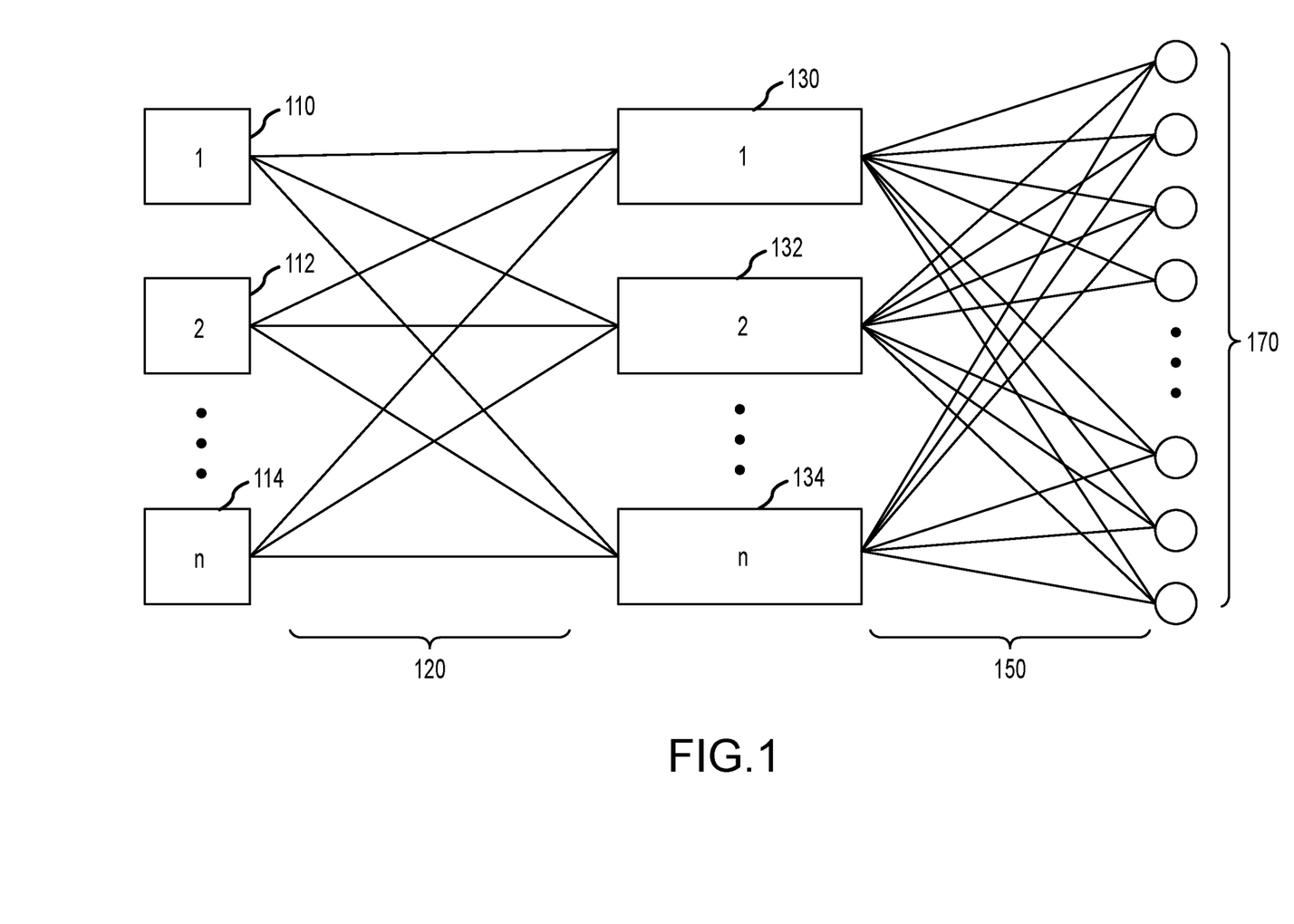
FIG. 1 is a high-level conceptual rendering of the redundant hybrid UAV power architecture according to one embodiment of the present invention.

FIG. 1 provides a high-view conceptual rendering for a hybrid vertical take-off and landing aerial vehicle power system architecture. To creates a redundant yet effective power system for a hybrid VTOL UAV the present system engages two or more generators 110, 112, 114 to creates multiple channels of high voltage power. In one embodiment a single generator 110, 112, 114, driven by liquid fueled engine (not shown), creates multiple channels 120 of high voltage power. In other embodiments two more generators each generate single yet different channels of high voltage power. Included in the hybrid VTOL UAV power architecture of the present invention are two or more high voltage domain modules 130, 132, 134. Each domain module receives a channel of power from the generator(s), interacts with a domain specific battery to store the power and then, when needed, redirects the power on a high-power bus unique 150 to that channel of power to a primary set of motors 170.

Concurrently, other channels of power, created by the generator(s) and directed through different high voltage power domain modules, store power on their domain specific battery and thereafter direct power in their high-power bus to a set of primary motors for that power domain module. Interposed between each high-power domain module and each motor is, in one embodiment, a switch (not shown) that, upon failure of the primary high-power domain bus, can switch to one of the secondary high-power domain busses. In one embodiment the switch is incorporated into each motor.

The present invention creates a reliable redundant power system without adding backup power sources or added components that would reduce the overall effectiveness of the UAV. The architecture of the present invention provides multiple paths by which power can be supplied to mission critical components.

Figure 2:
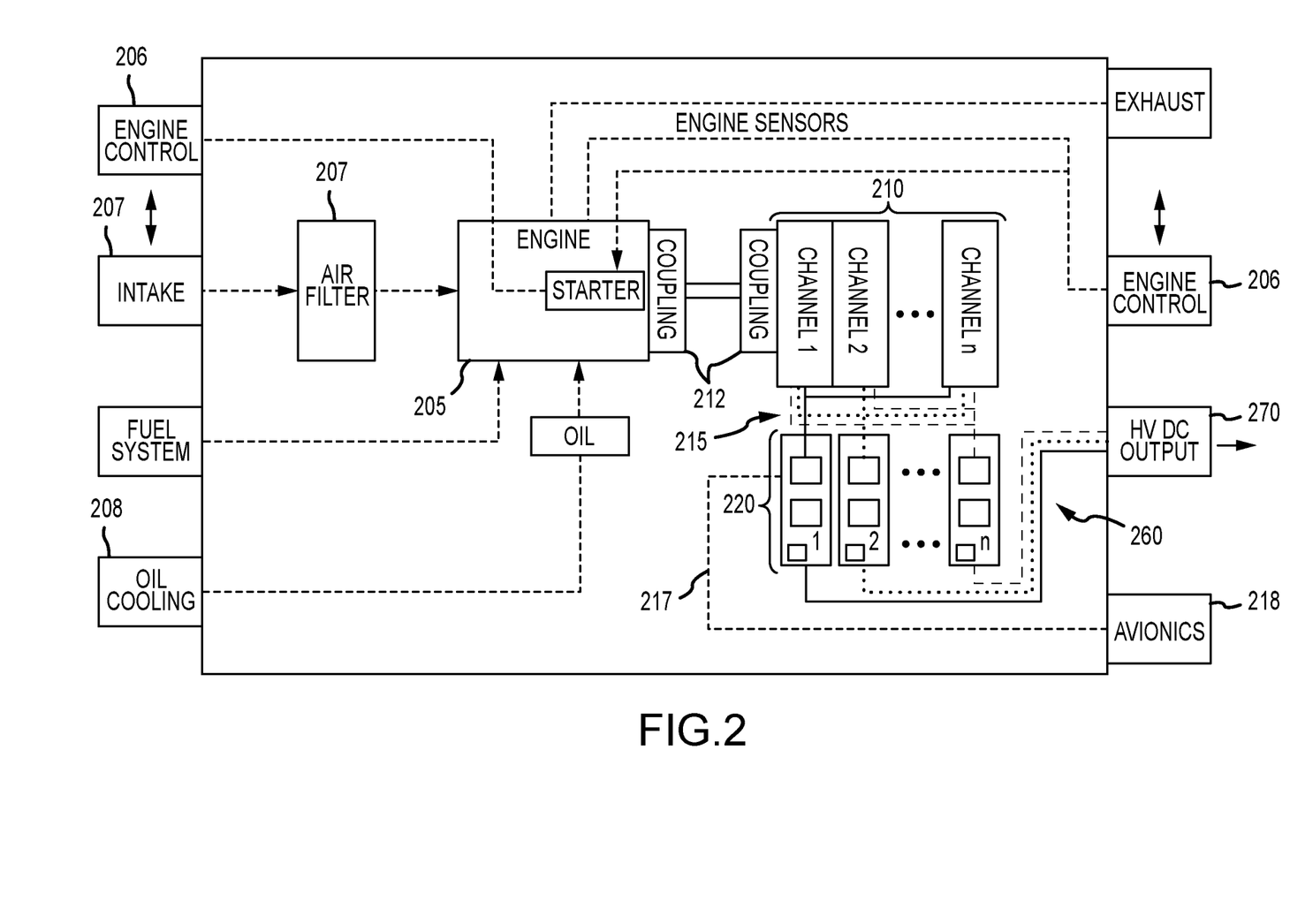
FIG. 2 a high-level system diagram of a redundant hybrid UAV power architecture according to one embodiment of the present invention.

FIG. 2 provides a high-level view of the hybrid vertical take-off and landing aerial vehicle power architecture of the present invention as integrated with the vehicle systems. The power system architecture of the present invention engages a liquid fuel engine 205 to drive one or more generators 210 producing two or more channels 215 of high voltage AC power. The UAV includes an engine control unit 206 to manage fuel flow, air intake 207 and cooling operations 208. The gas driven engine 205 is coupled to the generator(s) 210 through one or more gear boxes 212 to provide consistent turning of the generator(s).

In one embodiment of the present invention a single generator produces two or more channels of high voltage AC power. FIG. 2 presents an abstract view of two or more channels 215 of high voltage AC power formed from a two or more generating entities 210. As will be appreciated by one of reasonable skill in the relevant art each entity can be two or more generators each producing individual, yet separate channels of high voltage AC power or a single generator producing two more channels of high voltage AC power.

As shown in FIG. 2, redundant channels of high voltage AC power are created and directed to two or more high voltage domain modules 220. In this case a generator or generators produce channels 1-to-n of high voltage AC power. Each high voltage domain module 220 receives a single channel 215 of high voltage AC power. In this embodiment of the present invention, each high voltage domain module receives two or more instances of the same channel of high voltage AC power as each generator produces multiple channels. Thus, if one source of the high voltage AC power remains, each high voltage domain module can continue to operate. Note that power for avionic 218 and other systems that requires high voltage AC power is diverted 217 from the two or more high voltage domain modules prior to conversion to DC power.

As described herein, each high voltage domain module includes a rectifier, a power distribution unit, and a domain battery. High voltage AC power is converted to high voltage DC power for that specific channel and supplied to the power distribution unit. The power distribution unit supplies power to the battery for the domain as needed for charging as well as powering a unique high power DC bus. A multiple channel high power DC bus 260 is thereafter directed to motors and other UAV resources as a high voltage DC output 270.

Figure 3:
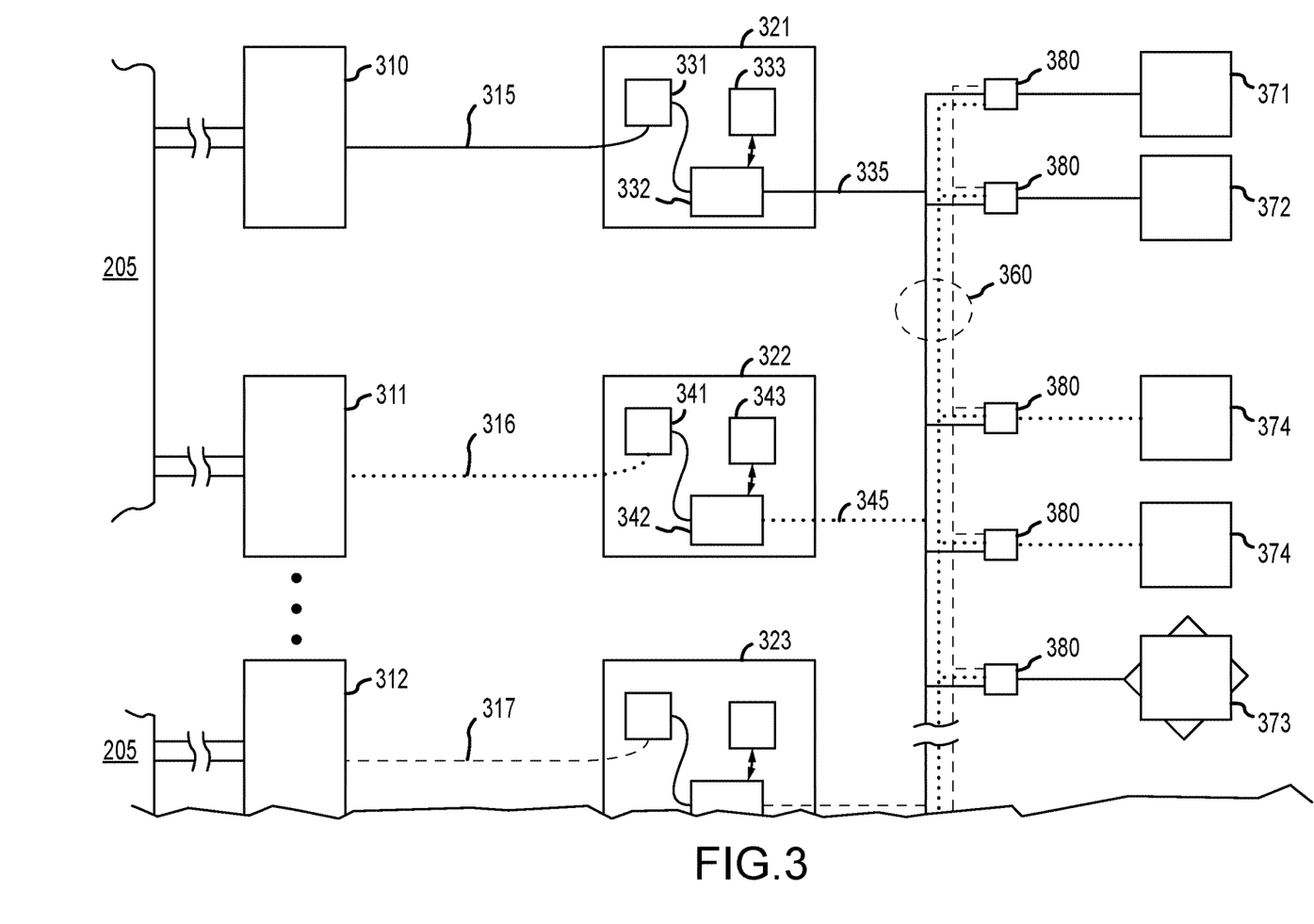
FIG. 3 shows an expanded view of the relationship between each high voltage generator channel output and each power domain forming a redundant hybrid UAV power architecture according to one embodiment of the present invention.

FIG. 3 presents another embodiment of a hybrid vertical take-off and landing aerial vehicle power architecture, according to the present invention, in which each generator 310, 311, 312 produces a single high voltage channel 315, 316, 317, respectively. As in the prior embodiment, a unique channel 315, 316, 317 of high voltage AC power is delivered to each high voltage domain module 321, 322, 323. A first channel 315 of high voltage AC power from a first generator 310 is directed to a first high voltage domain module 321. The AC power is received by a rectifier/inverter 331 converting the AC power to DC power. The power distribution unit 332 of the first high voltage domain module receives the newly converted DC power and concurrently supplies power to a domain battery 333 for charging and power a domain/channel specific high voltage DC bus 335. Each high voltage DC bus is associated with a primary set of motors. In the instance shown in FIG. 3, the first high voltage domain module 321 is associate with two vertical lift motors 371, 372 and one horizontal thrust motor 373. Interposed between each motor and the multiple channel high voltage DC bus is a switch 380.

A second high voltage domain module 322 similarly receives high voltage AC power channel 316 from another generator 311. Note, the high voltage AC power delivered to the first high voltage domain module 321 is different than the high voltage AC power delivered to the second high voltage domain module 322. As with the first high voltage domain module 321, the second channel 316 of high voltage AC power is converted to DC power 345 by a rectifier 341, directed to the domain battery or batteries 343 and a second channel high voltage DC bus by a power distributor unit 342. The multiple channel high voltage DC buss 360 can direct power to various motors and components. As shown, the multiple channel high voltage DC buss 360 delivers n channels of high voltage DC power to a variety of motors and accessories.

Responsive to failure of the second high voltage domain module 322 to supply power to its primary set of motors 374, 375, a switch 380 can select available power from multiple channel high voltage DC bus 360.

Figure 4:
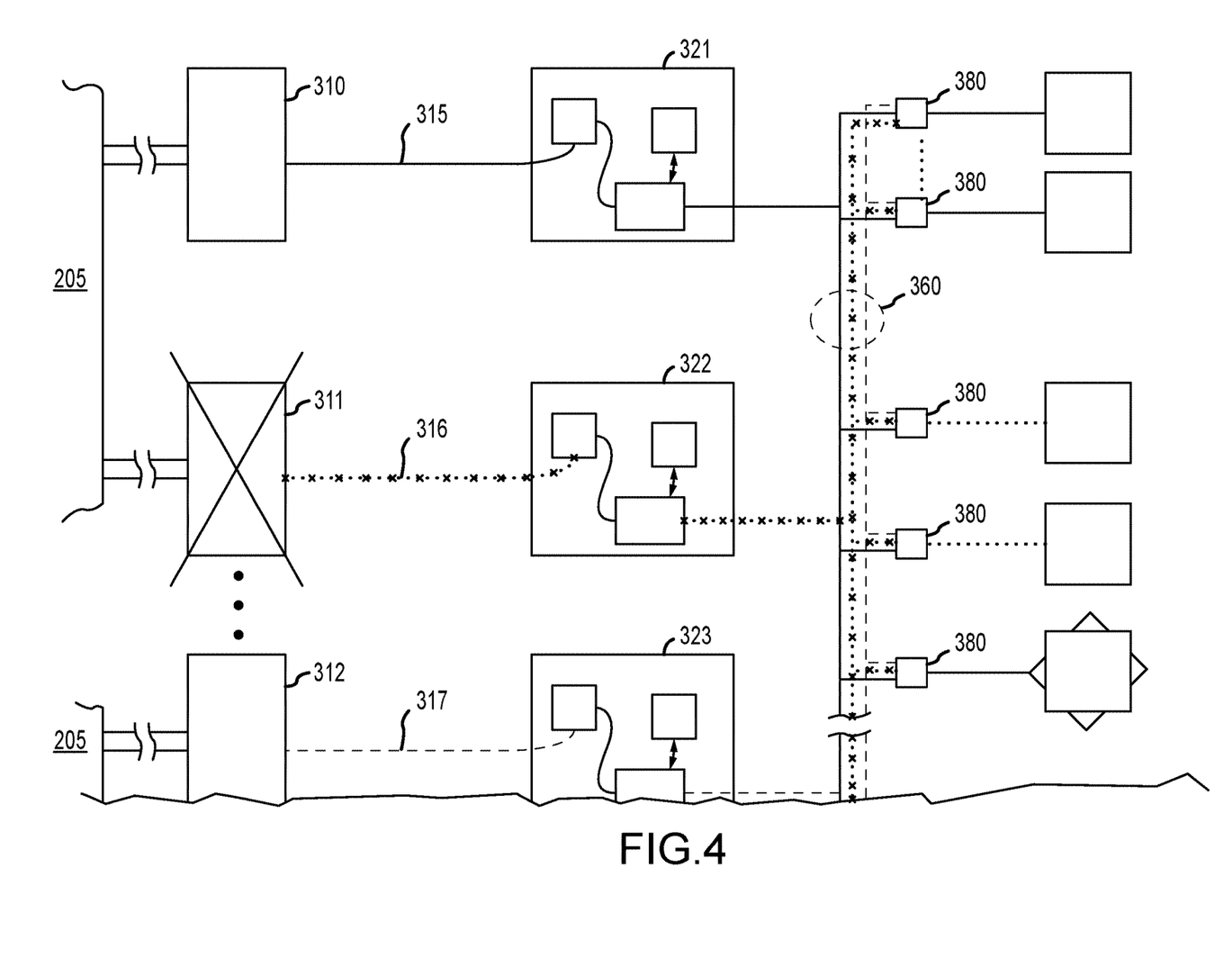
FIG. 4 shows an expanded view of the relationship between each high voltage generator channel output and each power domain of the redundant hybrid UAV power architecture of FIG. 3 wherein one of the HV generators has failed, according to one embodiment of the present invention.

FIG. 4 illustrates a failure of the second generator 311 to supply power to the second high voltage domain module 322. In this version of the present invention one of the two or more channels of high voltage DC power resident on the multiple channel high voltage DC buss 360 is absent. Recognizing a failure, switches 380 resident on the multiple channel high voltage DC buss 360 and interposed between each motor or primary set of motors and the high voltage domain modules 321, 322, 323, divert power from secondary channels to the lacking motors.

In another embodiment the primary set of motors is powered by a dedicated high voltage domain module. Failure of the primary high voltage domain module or the AC source of power from the generator would results in failure of the primary set of motors. However, as the remaining motors of the UAV are powered independently, the UAV remains operations, albeit with diminished capabilities.

Figure 5:
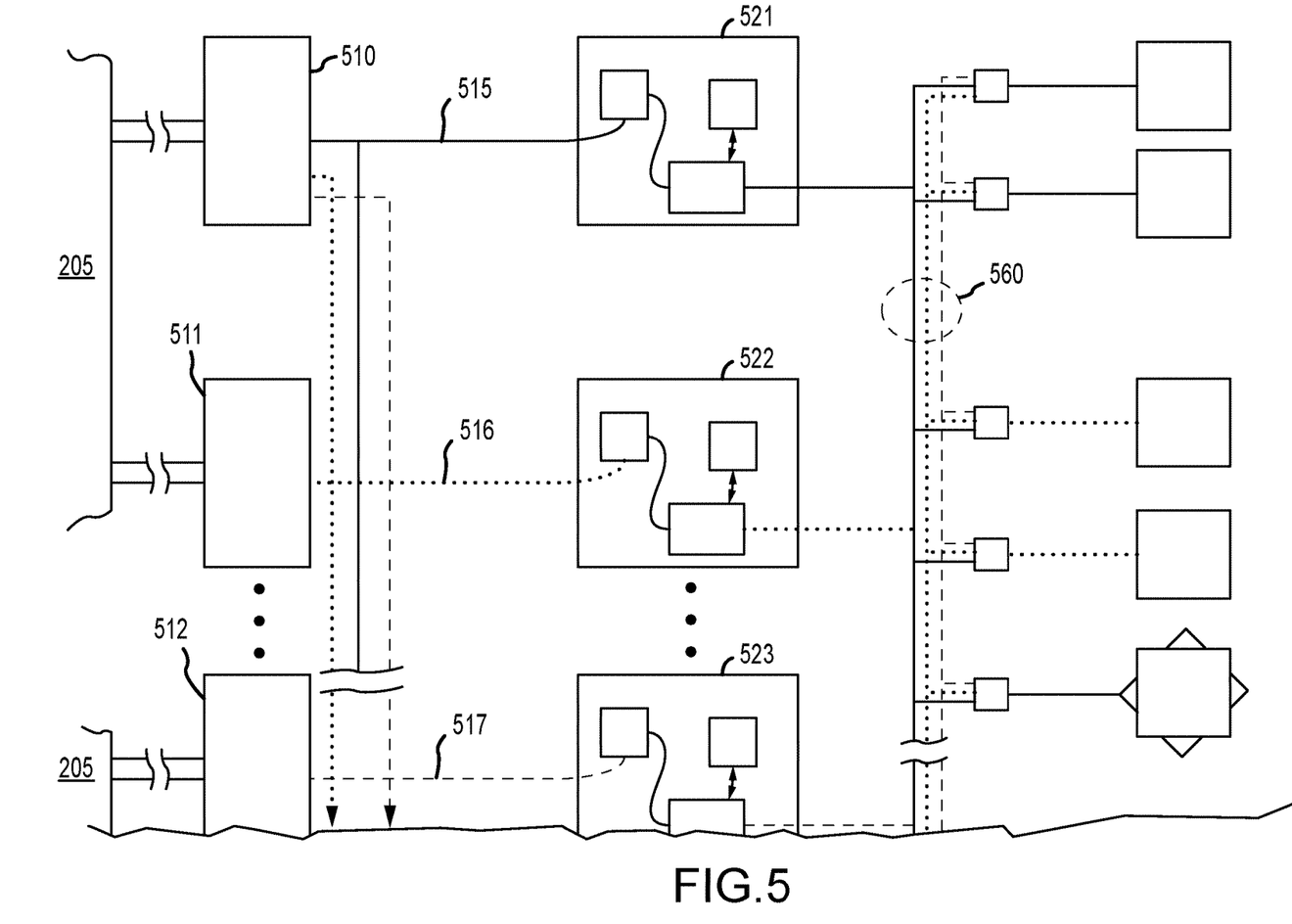
FIG. 5 shows an expanded view of the relationship between each high voltage generator channel output and each power domain forming another redundant hybrid UAV power architecture according to one embodiment of the present invention.

FIG. 5 presents another embodiment of a hybrid vertical take-off and landing aerial vehicle power architecture, according to the present invention. In the instance shown in FIG. 5 two or more generators 510, 511, 512 each produce two or more channels 515, 516, 517 of high voltage AC power. In this illustration, high voltage generator 1 510 produces three high voltage AC channels, channel 1 515, channel 2 516 and channel n 517. Similarly, high voltage generator 2 511 produces channel 1 515, channel 2 516 and channel n 517 as does high voltage generator n 512.

Channel 1 515 is commonly directed to high voltage domain module 1 521. Channel 2 516 is commonly directed to high voltage domain module 2 522 and channel n 517 is commonly directed to high voltage domain module n 523. As in the embodiment described with respect to FIG. 3, each high voltage domain module coverts the high voltage AC channel to a unique high voltage DC channel. Each domain module's power distribution unit interacts with a domain battery and supplies channel specific high voltage DC power to a multiple channel high voltage DC bus 560.

Responsive to failure of one or more generators 510, 511, 512 or high voltage AC channels 515, 516, 517, each high voltage domain module 521, 522, 523, and therefore its associated channel on the multiple channel high voltage DC bus, remains operational. High voltage AC power associated with each channel is redundantly supplied to each high voltage domain module 521, 522, 523.

In operation, the power required for VTOL operations for each channel is, in one embodiment, greater than the power supplied by the rectifier of each high voltage domain module. In this situation the power delivered to the power distribution unit is supplemented by the domain battery to deliver adequate power the primary motors associated with that channel of high voltage DC power. As the hybrid VTOL UAV transitions to conventional flight operations, the power required by the horizontal thrust motor is less than that supplied by the rectifier to the power distribution unit of each high voltage domain module. The domain battery, drained to support vertical flight operations, is supplied with the excess power thereby returning the battery to full charge in anticipation of future vertical flight operations. This optimization of battery usage results in a significant weight savings with no operational capability loss.

Figure 6:
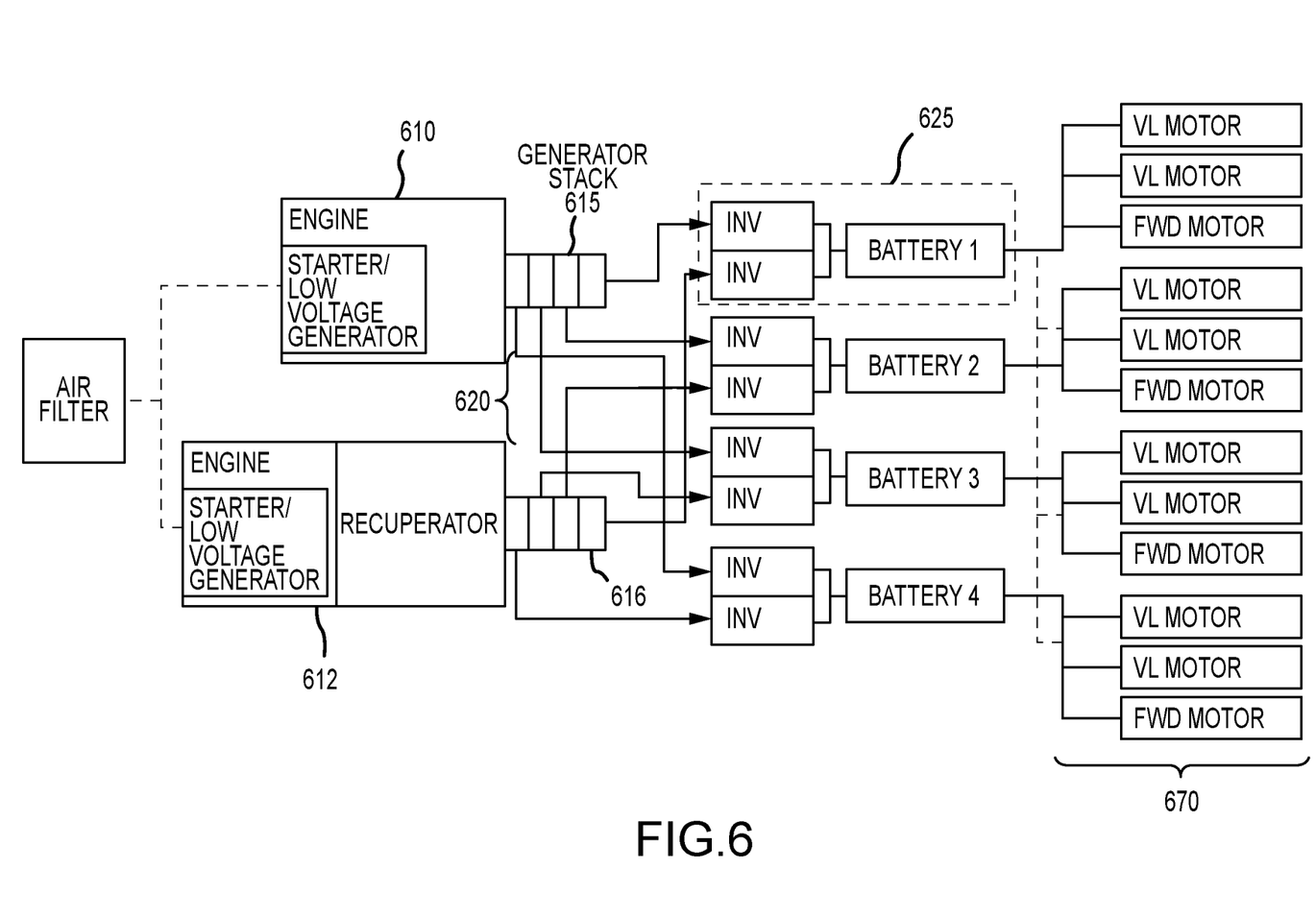
FIG. 6 presents one embodiment of a hybrid vertical take-off and landing aerial vehicle power architecture having two or more engines thereby driving a redundant multiple channel high voltage DC power architecture.

In another embodiment of the present invention two or more liquid fueled engines are employed to driver a plurality of generators. FIG. 6 presents on embodiment of a hybrid vertical take-off and landing aerial vehicle power architecture having two or more engines. In this embodiment each engine drives 610, 612 a separate generator stack 615, 616. The generator(s) each produce multiple channels 620 of high voltage AC power. As illustrated the first engine 610 is associated with a first generator stack 615 producing channels 1-4 620 of high voltage AC power. Similarly, the second engine 620 includes a second generator stack 616 producing corresponding channels 1-4 620 of high voltage AC power. In this instance shown in FIG. 6 the UAV motor configuration is divided into four primary groups 670 of motors. Each group includes a Vertical Lift motor and a forward thrust motor.

Each primary set of motors is associated with a primary high voltage domain module 625. Each high voltage domain module 625 includes at least one rectifier/inverter, a power distribution unit (not shown) and a battery. In this rendition each high voltage domain module includes two inverters/rectifiers, a power distribution unit (not shown) and a battery.

The supply of high voltage AC power is redundant to each high voltage domain module 625. Each engine supplies a channel of AC power to each high voltage domain module such that a loss of an engine does not result in a loss of any of the groups of motors. While for simplicity each high voltage domain module is shown as being associate with a single group of primary motors, the high voltage domain modules can be coupled to a multiple channel high voltage DC bus as described above, thereby increasing redundancy and reliability.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

The Hybrid eVTOL power system of the present invention forms a unique configuration of components avoiding concomitant multi-component certification and configuration issues—while producing power from a lighter-weight overall design, and with fewer battery cells. This hybrid configuration (vs a purely electric configuration) can employ one or more fuel-burning turbine engines, each having common parts (e.g., generators, turbines, compressors, etc.) as well as at least one of the two or more engines having an installed recuperator (i.e., at least one engine has an installed recuperator). The recuperator routes the recuperator-equipped (RE) engine's hot exhaust gases—heat that would otherwise be waste-heat—into a heat exchanger to preheat air flowing into the RE engine's compressor. A recuperator can be used to increase the efficiency of a turbine engine when the exhaust gas is hotter than the compressor outlet temperature, which is typically the case for smaller engines or engines with lower compression ratios. Thus, so-called microturbines and smaller engines—in any case engines having relatively low overall compression ratios—stand to gain the most from the use of a recuperator. The exhaust heat from the turbine is used to pre-heat the air from the compressor before further heating in the combustor (sometimes referred to as a "burner"), reducing the fuel input required. Practically, a doubling of engine efficiency is possible with the use of a recuperator. The heat exchange process provided by a recuperator substantially raises the temperature of air reaching the RE engine's combustor, which, in turn, substantially raises the RE engine's turbine temperature—ultimately translating into a lower temperature change required to reach a desired turbine temperature—thus producing this marked increase in the RE engine's efficiency.

During ground operations, the RE engine(s) electrical system may use to recharge the eVTOL's battery(-ies) through the eVTOL's electrical distribution system as described herein, for quieter operations while on the ground. The recuperator may also permit a wider throttle range, because of the ability of the RE engine(s) to produce power at a lower compressor speed, which, in turn, owes to the ability of each RE engine to, in effect, turn the RE engine into a high-compression-ratio engine, even for smaller engines, as discussed above.

During eVTOL takeoff, the non-RE engine(s) may also be used, augmenting the continuous power of the system, and ensuring transition between pure-/near-vertical and climb/cruise phases. In cruise, over longer ranges, all or some of the non-RE engine(s) may be shut down, boosting fuel efficiency substantially for that portion of the eVTOL's mission phase. This increase in cruise-phase efficiency may amortize to roughly 15 to 20% or more of the entire eVTOL mission's efficiency improvement, since the less fuel-efficient, "normal" engine(s) may also operate at certain high-power-demand points. These high-power-demand points may include vertical takeoff, vertical landing, as well as transitions from cruise to each of these vertical/near-vertical phases. Additionally, the less-efficient, non-RE engine(s) may be restarted for large enroute-altitude changes, or any other time where stored battery charge energy alone is insufficient to meet the eVTOL's electrical power demands.

The hybrid vertical take-off and landing aerial vehicle power architecture of the present invention provides a distributed electrical system with a common electrical power (high voltage DC) bus to accommodate power from any electrical input attached to the bus, whether battery or engine-driven generator(s). Typically, but not exclusively, the generators are high-voltage, high-speed generators ("HV generators"), because of the ability of these types of generators to run directly from a turbine engine's output shaft as discussed herein. The hybrid vertical take-off and landing aerial vehicle power architecture can draw electrical power from a battery(-ies), so that if one engine fails the battery(-ies) power(s) the Hybrid eVTOL for the short period from engine failure to restart of the fully functional engine(s). This construct: 1) enables quieter cruise and ground operations, since the RE engine(s), alone, is/are normally the operative engine(s) for cruise and ground operations; 2) increases eVTOL fuel efficiency in cruise and on the ground, since the RE engine(s) is/are more efficient than a single non-RE-engine; and 3) enables longer ranges because of the overall increase in Hybrid eVTOL efficiency.

Further, for VTOL operations, the power load is shared by the battery and the engine-driven generators. In contrast, in cruise as previously discussed, the battery is recharged from the RE-engine-driven generator(s) through the electrical bus.

One disadvantage of a recuperator is that it nearly doubles the weight of the typical turbine engine on which it is used. In one embodiment, one large, RE engine is used, with the weight increase essentially being offset (or worse, create a net deficit in) by efficiencies gained from use of a/(multiple) recuperator(s). By equipping only (a) certain number(s) of turbine engines with a recuperator, overall efficiency is still increased without excessively weight-burdening the eVTOL. In turn, this efficiency also reduces the stored electrical charge (i.e., battery) that would otherwise be needed if engine(s) were lost, thus reducing overall eVTOL weight. In cruise or other low-electrical-power-demand conditions the much lighter weight, non-RE(s) engine may be shut down, saving fuel, and increasing efficiency. These facts translate into less total fuel costs and/or longer mission ranges.

While there have been described above the principles of the present invention in conjunction with a hybrid vertical take-off and landing aerial vehicle power architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A power system architecture for a hybrid vertical take-off and landing aerial vehicle, comprising:
   one or more high voltage generators coupled to one or more liquid fueled turbine engines wherein the one or more high voltage generators produce two or more channels of high voltage AC power;
   two or more high voltage domain modules wherein each of the two or more high voltage domain modules is separately coupled to the one of the two or more channels of high voltage AC power and wherein each high voltage domain module includes a rectifier, a domain battery and a domain power distribution unit, wherein the rectifier is configured to accept one of the two or more channels of high voltage AC power and convert the one of the two or more channels of high voltage AC power to a converted channel of high voltage DC power and wherein the domain power distribution unit is configured to supply the domain battery with the converted channel of high voltage DC;
   a multiple channel high voltage DC bus coupled to each of the two or more high voltage domain modules and configured to transport each converted channel of high voltage DC power from each high voltage domain module to a plurality of motors wherein a set of motors is associated with a primary converted channel of high voltage DC power;
   a switch configured to replace the primary converted channel of high voltage DC power with a secondary channel of converted high voltage DC power from another of the two or more high voltage domain modules responsive to a failure of the primary converted channel of high voltage DC power.

2. The power system architecture for a hybrid vertical take-off and landing aerial vehicle according to claim 1, wherein the set of motors includes one or more vertical lift motors and at least one horizonal thrust motor.

3. The power system architecture for a hybrid vertical take-off and landing aerial vehicle according to claim 1, wherein each converted channel of high voltage DC power is associated with a different set of primary motors.

4. The power system architecture for a hybrid vertical take-off and landing aerial vehicle according to claim 1, wherein the power distribution unit supplies or receives the converted channel of high voltage DC power to or from the domain battery respectively based on load from the set of motors associated with the converted channel of high voltage DC power.

5. The power system architecture for a hybrid vertical take-off and landing aerial vehicle according to claim 1, wherein the one or more high voltage generators is a single generator producing two or more channels of high voltage AC power.

6. The power system architecture for a hybrid vertical take-off and landing aerial vehicle according to claim 1, wherein the one or more high voltage generators are two or more generators wherein each generator produces at least one channel of high voltage AC power.

7. The power system architecture for a hybrid vertical take-off and landing aerial vehicle according to claim 1, wherein the switch in incorporated into each motor.

8. A method for powering a hybrid vertical take-off and landing aerial vehicle, comprising:
- producing by one or more high voltage generators two or more channels of high voltage AC power, wherein the one or more high voltage generators are coupled to one or more liquid fueled turbine engines;
- coupling, separately, two or more high voltage domain modules to the one of the two or more channels of high voltage AC power wherein each high voltage domain module includes a rectifier, a domain battery and a domain power distribution unit;
- accepting, by each rectifier, one of the two or more channels of high voltage AC power;
- converting the one of the two or more channels of high voltage AC power to a converted channel of high voltage DC power;
- supplying by each domain power distribution unit the domain battery with the converted channel of high voltage DC;
- coupling a multiple channel high voltage DC bus to each of the two or more high voltage domain modules;
- transporting, by the multiple channel high voltage DC bus, each converted channel of high voltage DC power from each high voltage domain module to a plurality of motors wherein a set of motors is associated with a primary converted channel of high voltage DC power; and
- responsive to a failure of the primary converted channel of high voltage DC, replacing the primary converted channel of high voltage DC power with a secondary channel of converted high voltage DC power from another of the two or more high voltage domain modules.

9. The method for powering a hybrid vertical take-off and landing aerial vehicle according to claim 8, wherein the set of motors includes one or more vertical lift motors and at least one horizontal thrust motor.

10. The method for powering a hybrid vertical take-off and landing aerial vehicle according to claim 8, further comprising associating each converted channel of high voltage DC power with a different set of primary motors.

11. The method for powering a hybrid vertical take-off and landing aerial vehicle according to claim 8, further comprising supplying or receiving, by the power distribution unit, the converted channel of high voltage DC power to or from, respectively, the domain battery based on load from the set of motors associated with the converted channel of high voltage DC power.

12. The method for powering a hybrid vertical take-off and landing aerial vehicle according to claim 8, further comprising producing, by one of the one or more high voltage generator, two or more channels of high voltage AC power.

13. The method for powering a hybrid vertical take-off and landing aerial vehicle according to claim 8, further comprising producing, by each of two or more generators at least one channel of high voltage AC power.

* * * * *